United States Patent
Kurecka et al.

(10) Patent No.: US 6,907,774 B2
(45) Date of Patent: *Jun. 21, 2005

(54) TORSIONAL ACTUATION NVH TEST METHOD

(75) Inventors: Donald Joseph Kurecka, Rochester Hills, MI (US); Mark Norman Ranek, Clarkston, MI (US); David Paul Schankin, Harper Woods, MI (US); Zhaohui Sun, Rochester Hills, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/932,715

(22) Filed: Sep. 2, 2004

(65) Prior Publication Data

US 2005/0022580 A1 Feb. 3, 2005

Related U.S. Application Data

(63) Continuation of application No. 10/269,578, filed on Oct. 11, 2002, now Pat. No. 6,802,206.

(51) Int. Cl.⁷ .............................................. G01M 19/00
(52) U.S. Cl. ...................................................... 73/118.1
(58) Field of Search ........................... 73/118.1, 11.04, 73/114

(56) References Cited

U.S. PATENT DOCUMENTS

| | | |
|---|---|---|
| 3,326,036 A | 6/1967 | Hoeppner |
| 3,726,133 A | 4/1973 | Morgan |
| 3,770,077 A | 11/1973 | Johnson |
| 3,848,694 A | 11/1974 | Matsui et al. |
| 3,921,746 A | 11/1975 | Lewus |
| 4,002,043 A | 1/1977 | Yoshida |
| 4,103,532 A | 8/1978 | Buzzi |
| 4,160,390 A | 7/1979 | Spaetgens |
| 4,283,957 A | 8/1981 | Zobrist et al. |
| 4,406,642 A | 9/1983 | McNall |
| 4,487,592 A | 12/1984 | Strader |
| 4,646,210 A | 2/1987 | Skogler et al. |
| 4,898,026 A | 2/1990 | Damitz |
| 5,145,025 A | 9/1992 | Damian |
| 5,185,543 A | 2/1993 | Tebbe |
| 5,194,045 A | 3/1993 | Hanke |
| 5,328,408 A | 7/1994 | Wolf et al. |
| 5,352,157 A | 10/1994 | Ochs et al. |
| 5,354,237 A | 10/1994 | Amborn et al. |
| 5,419,192 A | 5/1995 | Maxwell et al. |
| 5,553,514 A | 9/1996 | Walkowc |
| 5,641,904 A | 6/1997 | Kopp et al. |
| 5,660,256 A | 8/1997 | Gallmeyer et al. |
| 5,749,269 A | 5/1998 | Szymanski et al. |
| 5,760,302 A | 6/1998 | Moradi et al. |
| 5,829,319 A | 11/1998 | Mokeddem |
| 5,877,420 A | 3/1999 | Moradi et al. |
| 5,884,902 A | 3/1999 | Hamada et al. |
| 5,922,952 A | 7/1999 | Moradi et al. |

(Continued)

*Primary Examiner*—Eric S. McCall
*Assistant Examiner*—Octavia Davis
(74) *Attorney, Agent, or Firm*—Harness, Dickey & Pierce P.L.C.

(57) ABSTRACT

A method for evaluating energy transmission from an axle through a vehicle suspension system. The methodology employs a torsional actuator to apply input energy to the vehicle in a manner that mimics the energy that is generated by the axle during the operation of the vehicle so that both the driving load and the vibration induced by gearset motion variation are simulated. Since the energy input can be quantified and monitored, the same amount of torque can be applied during each test to permit the technician to fully comprehend differences in the designs of several axles on the transmission of noise and vibration.

21 Claims, 2 Drawing Sheets

U.S. PATENT DOCUMENTS

| | | |
|---|---|---|
| 5,971,859 A | 10/1999 | Runge et al. |
| 5,986,545 A | 11/1999 | Sanada et al. |
| 6,068,555 A | 5/2000 | Andra et al. |
| 6,131,454 A | 10/2000 | Kopp et al. |
| 6,389,888 B1 | 5/2002 | Juranitch et al. |
| 6,454,674 B1 | 9/2002 | Krzesicki et al. |
| 6,619,672 B2 | 9/2003 | Charaudeau et al. |
| 6,626,787 B2 | 9/2003 | Porter |
| 6,802,206 B2 * | 10/2004 | Kurecka et al. ............. 73/114 |

* cited by examiner

TORSIONAL ACTUATION NVH TEST METHOD

CROSS-REFERENCE TO RELATED APPLICATIONS

This is a continuation of U.S. patent application Ser. No. 10/269,578 filed Oct. 11, 2002 now U.S. Pat. No. 6,802,206 entitled "Torsional Actuation NVH Test Method".

FIELD OF THE INVENTION

The present invention generally relates to a method for the evaluation of noise from an axle into a vehicle and more particularly to a method for experimentally evaluating the transfer functions that dictate the amount and type of axle energy that is transferred through a vehicle suspension system into the vehicle.

BACKGROUND OF THE INVENTION

Scientific evaluation of complex noise sources in automobiles, such as axles, has long been desired, particularly in view of recent advancements in the sound-proofing of modern automobiles. One problem that is encountered in this evaluation concerns the various paths through which noise may be transferred from its source into the vehicle. More specifically, the amount and type of energy that is transmitted from a noise source into the vehicle is a function of the interactions between the noise source and each item, component and/or assembly that couples the noise source to the vehicle. Without a thorough understanding and quantification of these transfer functions, the task of noise attenuation may be at least partially based upon improvements that are discovered through trial-and-error testing. Accordingly, the task of noise attenuation usually cannot be accomplished in the most expedient and efficient manner without a thorough understanding and quantification of the transfer functions that link a noise source to the vehicle.

In the context of an axle assembly, the amount and type of energy that is transmitted into the vehicle is a function of the interactions between the axle assembly and the vehicle suspension system (since the axle assembly is coupled to the vehicle suspension system) and the interactions between the vehicle suspension system and the vehicle body (since the vehicle suspension system is coupled to the vehicle body).

Mathematical (i.e., calculation-based) modeling of these transfer functions can be extremely complex and time consuming. Further complicating matters is the fact that a set of transfer functions is usually unique to a particular vehicle configuration. Changes in the suspension system, the vehicle body or the coupling of the suspension system to the vehicle body may therefore affect a vehicle's set of transfer functions to the extent that a new mathematical model would be desired.

Accordingly, there remains a need in the art for a method which improves the speed and accuracy with which a set of transfer functions that quantify the amount and type of energy that is transmitted from an axle through a vehicle suspension system are fashioned.

SUMMARY OF THE INVENTION

In one preferred form, the present invention provides a method for evaluating energy transmission into a vehicle over at least one transfer path between an axle and a vehicle suspension system. The method includes the steps of: applying a torsional input to a gearset in the axle to torsionally excite the axle in a manner that mimics the gearset's excitation of the axle during operation of the vehicle; and monitoring the energy that is transmitted through the vehicle suspension system into the vehicle via the at least one transfer path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
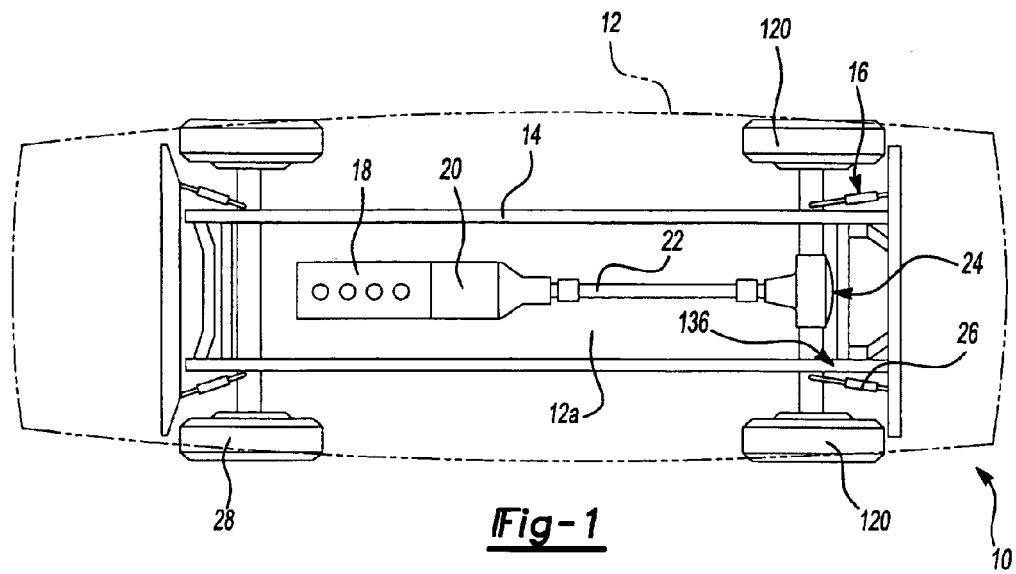
FIG. 1 is a schematic view of an exemplary vehicle that is being tested in accordance with the teachings of the present invention.
Figure 2:
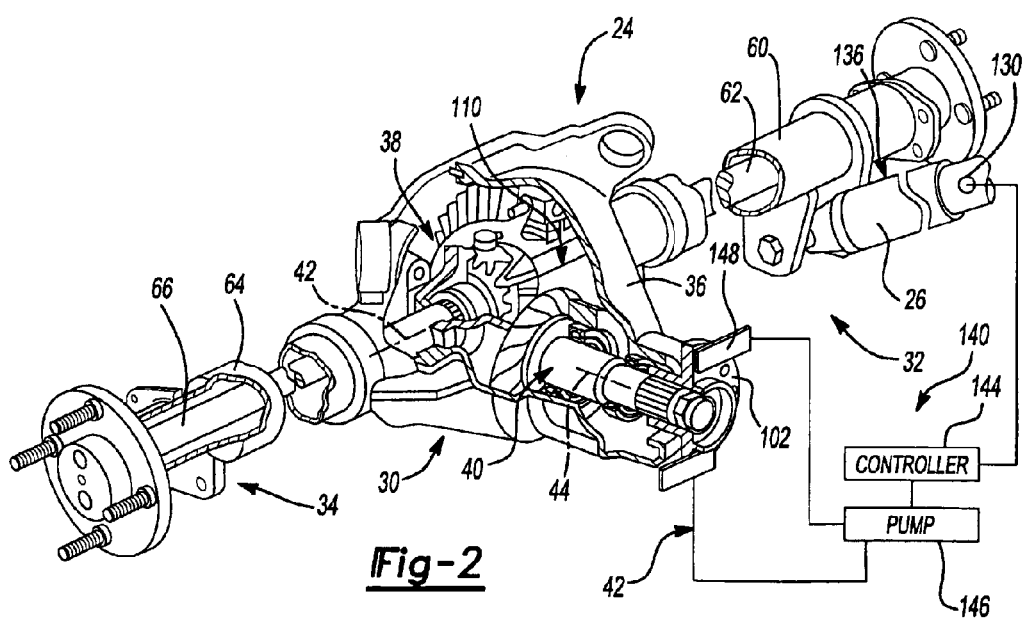
FIG. 2 is a schematic view of a portion of the vehicle of FIG. 1.
Figure 3:
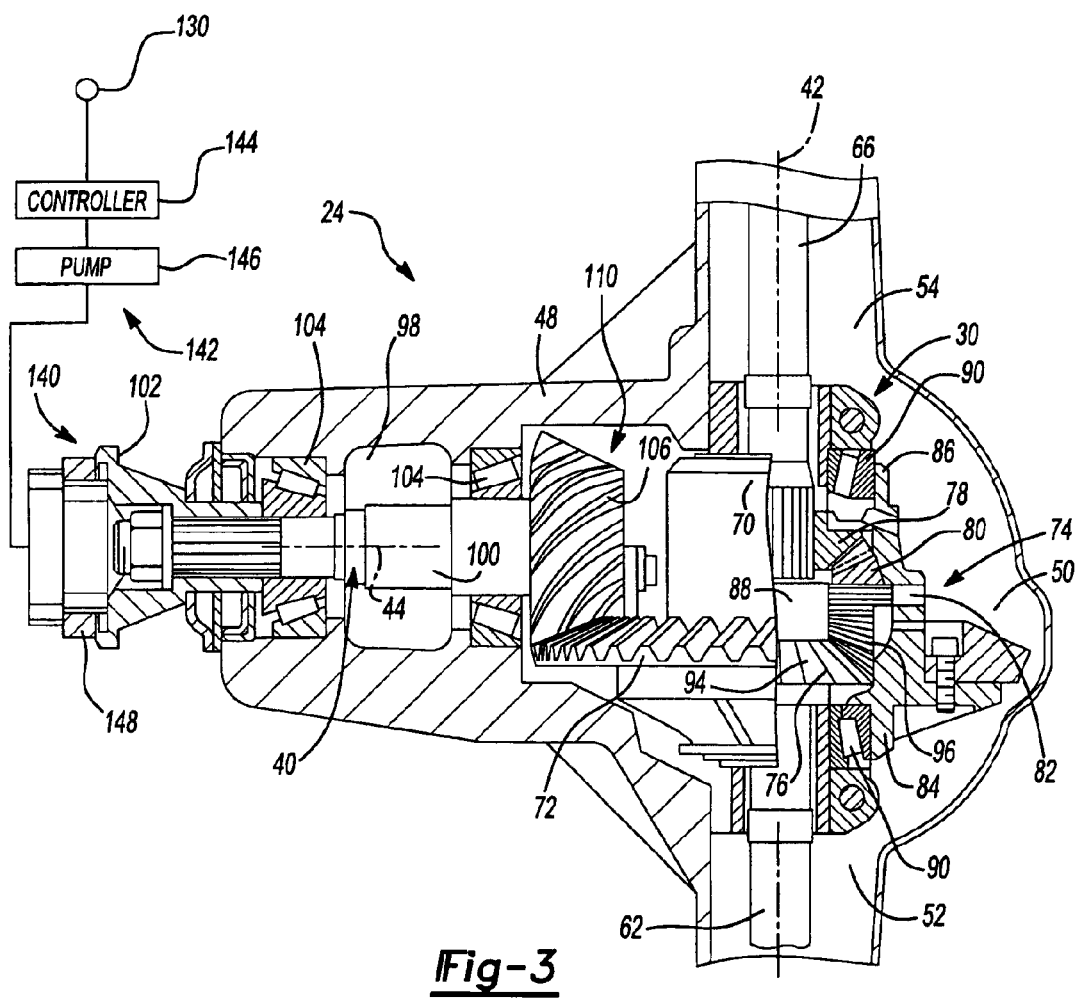
FIG. 3 is a partially broken away view of a portion of the vehicle of FIG. 1 illustrating the gearset of the axle in greater detail.

With reference to FIGS. 1 through 3 of the drawings, an exemplary vehicle tested in accordance with the teachings of the present invention is generally indicated by reference numeral 10. The vehicle 10 is illustrated to include a vehicle body 12, a chassis 14, a suspension system 16, a motor 18, a transmission 20, a propshaft 22 and an axle assembly 24. As these components are well known to those skilled in the art, a detailed discussion of their construction and operation need not be provided herein.

Briefly, the suspension system 16 resiliently couples the axle assembly 24 to the chassis 14 via conventional components such as shock absorbers 26 and struts 28. The motor 18 and the transmission 20 are conventionally operable for supplying a rotary input to the axle assembly 24 via the propshaft 22.

With specific reference to FIGS. 2 and 3, the axle assembly 24 is illustrated to include a differential assembly 30, a left axle shaft assembly 32, and a right axle shaft assembly 34. The differential assembly includes a housing 36, a differential unit 38 and an input shaft assembly 40. The housing 36 supports the differential unit 38 for rotation about a first axis 42 and further supports the input shaft assembly 40 for rotation about a second axis 44 that is generally perpendicular to the first axis 42.

The housing 36 is typically formed in a suitable casting process and is thereafter machined as required. The housing 36 includes a wall member 48 that defines a central cavity 50 having a left axle aperture 52 and a right axle aperture 54.

The left axle shaft assembly 32 includes a first axle tube 60, which extends into the left axle aperture 52 and is fixedly coupled to the housing 36, as well as a first axle half-shaft 62 that is supported for rotation in the first axle tube 60 about the first axis 42. Similarly, the right axle shaft assembly 34 includes a second axle tube 64, which extends into the right axle aperture 54 and is fixedly coupled to the housing 36, as well as a second axle half-shaft 66 that is supported for rotation in the second axle tube 64 about the first axis 42.

The differential unit 38 is disposed within the central cavity 50 of the housing 36 and includes a case 70, a ring gear 72 that is fixed for rotation with the case 70, and a differential gearset 74 that is disposed within the case 70. The differential gearset 74 includes first and second side gears 76 and 78, respectively, and a plurality of differential pinions 80 that are rotatably supported on pinion shafts 82 that are mounted to the case 70. The case 70 includes a pair of trunnions 84 and 86 and a gear cavity 88. A pair of bearing assemblies 90 are shown to support the trunnions 84 and 86 for rotation about the first axis 42. The first axle half-shaft 62 and the second axle half-shaft 66 extend through the left and right axle apertures 52 and 54, respectively, and are coupled for rotation with the first and second side gears 76 and 78, respectively. The case 70 is operable for supporting the plurality of differential pinions 80 for rotation within the gear cavity 88 about one or more axes that are perpendicular to the first axis 42. The first and second side gears 76 and 78 each include a plurality of teeth 94 that meshingly engage teeth 96 that are formed on the differential pinions 80.

The input shaft assembly 40 extends through the input shaft aperture 98 and includes an input pinion shaft 100, a conventional propshaft coupling flange 102 and a pair of conventional bearing assemblies 104. Each of the bearing assemblies 104 is coupled to the housing 36 and supports the input pinion shaft 100 for rotation about the second axis 44. The input pinion shaft 100 includes a plurality of pinion teeth 106 that meshingly engage the ring gear 72. Accordingly, rotary power transmitted to the input pinion shaft 100 (via the propshaft 22) is communicated to the ring gear 72 which serves to rotate the case 70 to thereby transmit the rotary power through the differential gearset 74 and to the first and second axle half-shafts 62 and 66 in a predetermined manner.

As the vehicle body 12 is coupled to the chassis 14, noise generated by the axle assembly 24 during the operation of the vehicle 10 is able to migrate into the vehicle passenger compartment 12a where it would be felt or heard by the vehicle passengers. One component of the noise that is generated by the axle assembly 24 is induced by subtle variances in the formation of each tooth in the axle gearset 110 (i.e., the input pinion teeth 106, the ring gear 72, and the differential gearset 74), as well as subtle variances in the location of each tooth relative to the pitch diameter of its associated gear and in the mounting of the gear relative to the other gears in the axle gearset 110. Another component of the noise that is generated by the axle assembly is gearset motion variation, which may be described as an acceleration (positive or negative) that migrates through the axle gearset 110 in response to variances in the magnitude of the rotary input (i.e., torque or speed) that is transmitted to the axle gearset 110 via the propshaft 22.

With additional reference to FIG. 1, the methodology of the present invention will now be discussed in detail. The vehicle 10 is prepared for testing by uncoupling the propshaft 22 from the propshaft coupling flange 102 and locking the drive wheels 120 so as to prevent the axle assembly 24 from rotating the drive wheels 120 during the test. An appropriate sensor array having a plurality of vibration sensors 130, such as accelerometers, is employed to generate a sensor signal in response to the sensed vibrations that are being transmitted into the vehicle passenger compartment 12a. As is discussed in detail in commonly assigned copending U.S. patent application Ser. No. 09/796,205 entitled "Active Vibration Control", the disclosure of which is hereby incorporated by reference as if fully set forth herein, vibrations are transmitted into the vehicle passenger compartment 12a through a plurality of transfer paths 136, wherein each transfer path 136 includes a component or assembly of the suspension system 16 that links or couples the axle assembly 24 to the chassis 14. Accordingly, the suspension system 16 and/or vehicle body 12 may be instrumented with one or more vibration sensors 130 to generate a sensor signal in response to the vibrations that are produced by the axle assembly 24.

An actuator 140, which is coupled to the input shaft assembly 40 (e.g., to the propshaft coupling flange 102, is configured to apply a torsional input to the axle assembly 24. In the particular embodiment illustrated, the actuator 140 includes a servo-control system 142 having a controller 144, a hydraulic pump 146 and a linear actuator 148 that is coupled in fluid connection to the hydraulic pump 146.

Preferably, the torsional input excites the axle gearset 110 in a manner that mimics the excitation of the axle gearset 110 as it would ordinarily be during the normal operation of the vehicle 10. Accordingly, the controller 144 is employed to regulate and control the magnitude of the torsional input. More specifically, the controller 144 controls the actuator 140 (i.e., the hydraulic pump 146) in a manner such that a first portion of the torsional input simulates a powertrain input torque (i.e., a torque that is delivered to the axle assembly 24 from the propshaft 22 for propelling the vehicle 10) and a second portion of the torsional input simulates a torsional vibration induced by gearset motion variation. Preferably, the first portion is static and approximately constant over a predetermined time increment, while the second portion is dynamic and oscillates over the same time increment.

Vibrations transmitted through the suspension system 16 and into the vehicle body 12 are sensed by the vibration sensors 130, which produces an associated array of sensor signals in response thereto. The sensor signals permit the technician to evaluate the relative degree to which noise induced by gearset motion variation is transmitted into the vehicle passenger compartment 12a. As will be apparent to those skilled in the art, the energy that is input by the actuator to the axle assembly 24 may be readily quantified and monitored and as such, noise dampening efforts may be tailored to meet a given noise threshold in a manner that is both convenient and cost effective.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method comprising:
   locking the output of an axle to prevent rotation;
   applying a torque to an input shaft of the axle; and
   monitoring energy that is transmitted to a vehicle suspension through at least one transfer path.

2. The method of claim 1, wherein a magnitude of the torque is not constant during a time period in which energy transmission to the vehicle suspension through the transfer path is being monitored.

3. The method of claim 2, wherein the torque includes a first portion which varies over the time period, and a second portion which is constant over the time period.

4. The method of claim 3, wherein the first portion varies in a predetermined manner.

5. The method of claim 4, wherein the predetermined manner is oscillation.

6. The method of claim 1, wherein a hydraulic actuator is employed to apply the torque to the input shaft.

7. The method of claim 6, wherein the hydraulic actuator is a linear actuator.

8. The method of claim 1, wherein locking the output of the axle includes locking the drive wheels of a vehicle against rotation.

9. The A method comprising:
   coupling a torsional actuator to an input of a power-transmitting device, the power-transmitting device having a gearset;
   controlling the torsional actuator such that the torsional actuator applies a torque input to the input, the torque input having a static portion and a dynamic portion, the static portion simulating power train torque and the dynamic portion simulating torsional vibration induced by gearset motion variation; and
   monitoring the energy that is transmitted to a vehicle suspension through at least one transfer path.

10. The method of claim 9, wherein the power-transmitting device is an axle assembly.

11. The method of claim 9, wherein the static portion has an approximately constant magnitude.

12. The method of claim 9, wherein the dynamic portion has a magnitude that varies over time.

13. The method of claim 12, wherein the magnitude of the dynamic portion oscillates.

14. The method of claim 1, wherein the controlling step is performed by a servo-control system.

15. The method of claim 14, wherein the servo-control system is driven by a hydraulic pump.

16. The method of claim 9, wherein the torsional actuator includes a linear actuator that is mounted to apply a force to the input in a manner that tends to rotate the input about an axis.

17. A method for evaluating energy transmission in a motor vehicle through a transfer path between an axle assembly and a chassis, the axle assembly having an input, an output and a differential gearset interconnecting the input to the output, comprising:
   locking the output of the axle assembly;
   applying a torque input to the input of the axle assembly; and
   monitoring the energy that is transmitted through the transfer path.

18. The method of claim 17 further comprising the step of coupling an actuator to the input of the axle assembly for applying the torque input thereto.

19. The method of claim 17 wherein the torque input excites the differential gearset to mimic operation of the vehicle.

20. A method comprising:
   providing a power-transmitting device having an input member and an output member;
   locking the output member against rotation;
   applying a torsional input to the input member having first and second portions; and
   monitoring the energy transmitted from the power-transmitting device through an energy transfer path.

21. The method of claim 20 wherein the method is employed in a motor vehicle to monitor and evaluate the energy transmitted from an axle assembly to a chassis through a suspension component.

* * * * *